3,563,917
QUINOXALINE POLYMERS
Carl S. Marvel, Tucson, Ariz., assignor to Research Corporation, New York, N.Y., a nonprofit corporation of New York
No Drawing. Filed Jan. 24, 1966, Ser. No. 522,378
Int. Cl. C08g 33/02
U.S. Cl. 260—2                    3 Claims

ABSTRACT OF THE DISCLOSURE

Thermostable single-and double - strand quinoxaline polymers are prepared by the condensation of aromatic amines with hydroxy-, halo- or phenoxy-substituted aromatic compounds.

---

This invention relates to heterocyclic nitrogen compositions. In its more specific aspects, it relates to condensed heterocyclic compounds, single-strand and double-strand polymers, and intermediates useful in the preparation of such compositions.

The compositions of the present invention are characterized by the presence of a quinoxaline nucleus in their structure, and are further characterized by high melting points, a high degree of thermal stability and resistance to oxidation at elevated temperatures. The polymeric compositions are particularly useful in the preparation of oxidation, and corrosion-resistant articles capable of use at temperatures in excess of 400° C.

The condensed heterocyclic compounds of the present invention are 2,2'-bisfluoflavine and 5,6,8,9,14,15,17,18-octaaza-6,8,15,17-tetrahydroheptacene. These compounds are colored materials useful as dyestuffs and in the preparation of other azine dyestuffs, for example, the hydroxyl and amino substituted compounds. Methods conventionally employed in dyestuff chemistry, including sulfonation and nitration, may be utilized to introduce such substituents into these compounds.

The single-strand quinoxaline polymers of the present invention are polyfluoflavine and polyoctaazatetrahydroheptacene. The double-strand polymers are characterized by the recurring structural units:

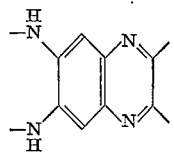

and

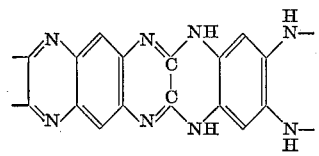

Both the single-strand and the double-strand polymers melt above 360° C. and are generally insoluble in conventional organic solvents. They are soluble in strongly acidic solvents such as sulfuric acid, polyphosphoric acid, methanesulfonic acid, and the like. Also attributable to the presence of basic nitrogen atoms is the affinity of these compositions for acid dyestuffs.

The polymers of the present invention may be formed into fibers, cast as films or otherwise converted to shaped articles wherein their unique stability to elevated temperatures may be effectively utilized. These polymers are so resistant to oxidation that they resist burning in the usual combustion analysis for carbon and hydrogen.

The double-strand polymers are particularly adapted to drawing as textile fibers and may be used alone or in conjunction with other fibers to improve their high temperature properties. These fibers may be woven or knit into fabrics resistant to corrosion and to the action of moisture and oxygen. Similarly, polymeric films may be used to protect other articles from corrosion and other adverse effects accelerated by exposure to elevated temperatures.

The novel quinoxaline intermediates of the present invention are 2,3-diphenoxyquinoxaline, bisquinoxalines of the formula:

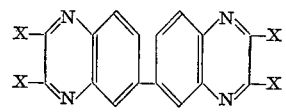

and tetraazaanthracenes of the formula:

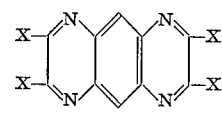

wherein X represents hydroxy, halo or phenoxy.

The repairs of ortho-disposed substituents in the above intermediates need not be identical. And, the intermediates may be substituted by alkyl and other groups which will not interfere in the subsequent condensation reaction used to prepare the compositions of the present invention. Such substituents would be present unchanged in the final products.

As indicated above, hydroxy, halo and phenoxy intermediates are used in preparing the compositions of the present invention. These intermediate compositions may be prepared by reacting an ortho diamine with oxalic acid to form a cyclic diamide. The diamide is tautomeric with the corresponding dihydroxy compound and may be converted to the corresponding dichloro compound by means of conventional chlorinating agents such as phosphorus pentachloride, thionyl chloride, phosphorus oxychloride, et cetera. Reaction of the resultant dichloro compound with phenol or its alkali metal salt yields the corresponding phenoxide.

The preparation of 2,3-diphenoxyquinoxaline, using this approach, is illustrated below. The reactant 2,3-dihydroxyquinoxaline was prepared from o-phenylenediamine and oxalic acid; the cyclic amide or keto form is in tautomeric equilibrium with the dihydroxy compound or enol form. The dihydroxy compound was converted to the dichloro compound by means of phosphorus oxychloride. Reaction with phenol or sodium phenoxide yields the diphenoxy compound.

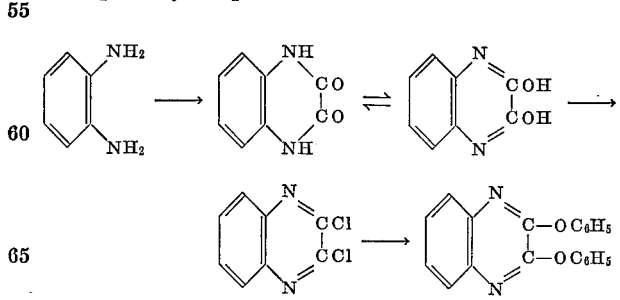

The same approach is used to prepare 2,2',3,3'-tetraphenoxy-6,6'-bisquinoxaline. 3,3-diaminobenzidine is reacted with oxalic acid to form the bis-(cyclic diamide), which is converted to the tetrachloro compound by means of phosphorus pentachloride and then to the tetraphenoxy compound by means of phenol.

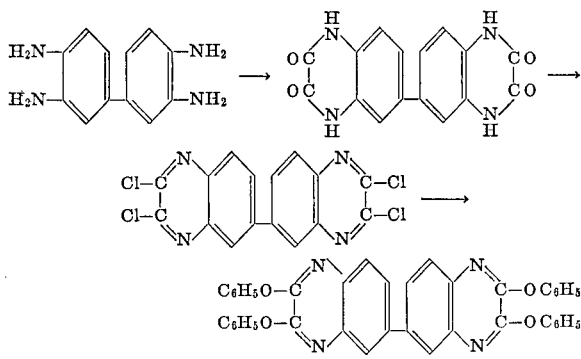

In a similar manner 1,2,4,5-tetraaminobenzene has been converted to a tetrafunctional series of derivatives of tetraazaanthrancene and ultimately to 2,3,7,8-tetraphenoxy-1,4,6,9-tetraazaanthracene.

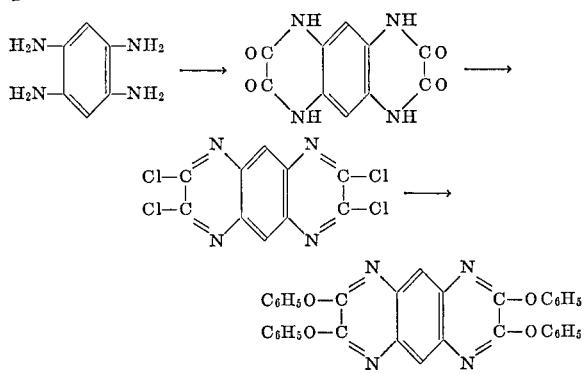

The tetraphenoxy compound from diaminobenzidine has been converted to 2,2'-bisfluoflavine, the formula of which is shown below, by heating with o-phenylenediamine. The same product has been obtained by heating 3,3'-diaminobenzidine with 2,3-diphenoxyquinoxaline and by heating tetrahydroxy-bis-quinoxaline with o-phenylenediamine in polyphosphoric acid. While these reactions might be expected to give somewhat different products, they apparently tautomerize to the same final product exhibiting UV absorption at 410, 433 and 459 millimicrons.

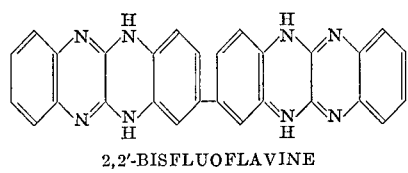

2,2'-BISFLUOFLAVINE 5,6,8,9,14,15,17,18-octaaza - 6,8,15,17 - tetrahydroheptacene, the formula of which is shown below, was prepared from tetraphenoxytetraazaanthracene and o-phenylenediamine; from tetraaminobenzene and 2,3-diphenoxyquinoxaline and from tetrahydroxytetraazaanthracene and o-phenylenediamine in the presence of polyphosphoric acid. The same product was obtained in each case.

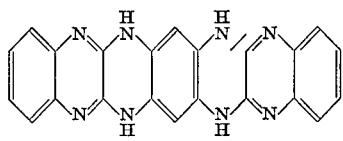

Generally speaking, the reaction of a polyhydroxy compound with a polyamino compound is effected in the presence of polyphosphoric acid. The polymeric product usually precipitates on addition of the reaction mixture to water. Molten phenol is often employed as the solvent in reactions between polyphenoxy compounds and polyamines. The polymer product may then be completely precipitated by the addition of a non-solvent miscible with phenol.

Polyfluoflavine, a single-strand polymer, has been obtained by heating 3,3'-diaminobenzidine with the tetraphenoxy-bisquinoxaline compound in phenol. Heating the corresponding tetrahydroxyquinoxaline and diaminobenzidine in the presence of polyphosphoric acid also gave this polymer.

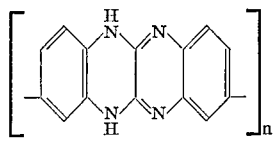

Poly - (octaazatetrahydroheptacene), another single-strand polymer, was obtained by condensing tetrahydroxytetraazaanthracene with diaminobenzidine in polyphosphoric acid. The polymer has the structural unit shown below. Heating tetraphenoxytetraazaanthracene with 3,3'-diaminobenzidine in phenol solution gave a polymer with the same structural unit:

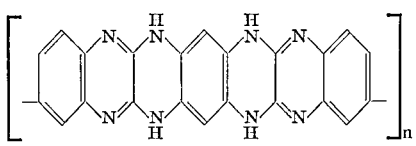

POLY-(OCTAAZATETRAHYDROHEPTACENE

The same techniques used to prepare the above single-strand quinoxaline polymers were used to prepare double-strand quinoxaline polymers. A homopolymer having the structural unit shown below is obtained by heating 2,3-hydroxy - 6,7 - diaminoquinoxaline in a poly-phosphoric acid..

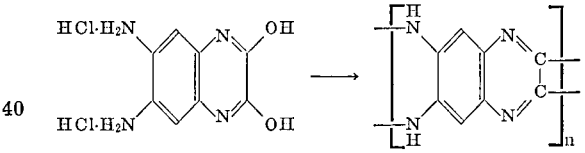

1,2,4,5,-tetraaminobenzene tetrahydrochloride has also been converted to a similar double-strand or ladder structure polymer with quinoxaline units. When the tetraamine is reacted with tetraphenoxytetraazaanthracene in the presence of polyphosphoric acid, a polymer having the structural unit shown below is obtained. Heating the same reactants in boiling phenol gave a product which was soluble in dimethylsulfoxide and probably does not have all of its rings closed. Heating the tetraamine with tetrachloro-or with tetrahydroxytetraazaanthracene in polyphosphoric acid gave a polymer similar to that attained from the tetrahydroxy compound. In the structural formula shown below, X may be hydroxy, halo or phenoxy.

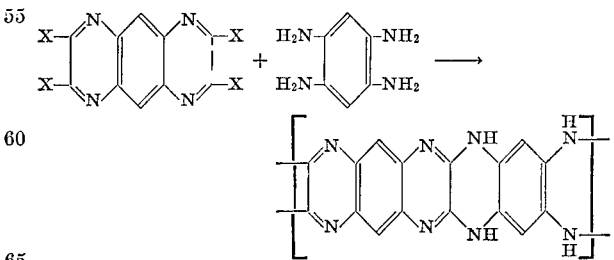

Our invention is further illustrated by means of the following examples showing the preparation of intermediates, condensed heterocycles, single-strand quinoxaline polymers and double strand quinoxaline polymers according to the present invention:

INTERMEDIATES

Example I.—2,3-diphenoxyquinoxaline intermediates (A) 2,3-dichloroquinoxaline (19.9 g., 0.1 mole) was boiled under reflux with phenol (40 g., 0.42 mole) for 14 hours. After cooling, the mixture was triturated with 50 ml. of methanol and the white crystalline residue recrystallized from dioxane-methanol. The yield was 28 g. (89%) of 2,3-diphenoxyquinoxaline, M.P. 164–165° C.

(B) The same product was obtained when 2,3-dichloroquinoxaline (0.2 g., 0.01 mole) and sodium phenoxide (4.6 g., 0.4 mole) was boiled under reflux in 40 ml. of dimethylformamide for 30 minutes. The reaction mixture was filtered and water added to the filtrate until a crystalline precipitate formed. The yield after recrystallization from acetone-methanol was 2.7 g. (86%), M.P. 164–165° C.

Example II.—2,2′,3,3′-tetrachloro-6,6′-bisquinoxaline

A mixture of 2.2 g. of 3,3′-diaminobenzidine and 2.6 g. of oxalic acid dihydrate was dissolved in 20 ml. of 4 N HCl. The solution was heated at reflux temperature for 3 hours. A slightly brownish powder appeared during the heating. The mixture was cooled, the powder collected on a filter, washed with methanol and dried.

Five g. of the intermediate bis-(cyclic diamide) was placed in a flask with 15 ml. of phosphorus oxychloride and 5 ml. of N,N-dimethylaniline. The solution was heated at reflux temperature for 3 hours, cooled, and poured into 100 ml. of ice water. The precipitate was collected on a filter, dried and extracted with hot benzene. The benzene extract yielded 4.7 g. (80%) of 2,2′,3,3′ - tetrachloro-6,6′-bisquinoxaline. After recrystallization from benzene, the product melted at 293–294° C.

Example III.—2,2′,3,3′-tetraphenoxy-6,6′-bisquinoxaline 2,2′,3,3′ - tetrachloro-6,6′-bisquinoxaline (3.96 g., 0.01 mole) was boiled under reflux with phenol (7.5 g., 0.08 mole) for 14 hours. After cooling, the solid mass was extracted with hot methanol until the washing liquid was colorless. The yield was 4.85 g. (77.5%) of 2,2′,3,3′-tetraphenoxy-6,6′-bisquinoxaline, M.P. 247–249° C.

Example IV.—2,3,7,8-tetrahydroxy-1,4,6,9-tetraazaanthracene 1,5-diamino-2,4-dinitrobenzene (10 g.) was hydrogenated in 50 ml. of dioxane at 60° C. with 1 g. of 5% Pd on charcoal. When the absorption of hydrogen had stopped, the reaction mixture was cooled and the solvent poured off under nitrogen and discarded. The tetramine was separated from the catalyst by dissolving it in 100 ml. of degassed 2 N HCl and filtering into 200 ml. of concentrated hydrochloric acid and boiled under reflux for 3 hours with 20 g. oxalic acid. 2,3,7,8-tetrahydroxy-1,4,6,9,-tetraazaanthracene precipitated as a light brown solid, which weighed 12 g. after drying (97.5%), M.P. above 360° C.

Example V.—2,3,7,8-tetrachloro-1,4,6,9-tetraazaanthrancene (A) The product of Example IV (12.3 g., 0.05 mole), phosphorus oxychloride (62 g., 0.4 mole), and antimony trichloride (123 g.) were refluxed together for 7 hours. After cooling, the reaction mixture was poured into a mixture of ice and concentrated hydrochloric acid. The residue was separated by centrifugation, washed successively with dilute hydrochloric acid, water and methanol, dried and then extracted with benzene in a Soxhlet apparatus. The yield of 2,3,7,8-tetrachloro-1,4,6,9-tetraazaanthracene was 5.2 g. (32%) as pale yellow needles, M.P. 330° C.

(B) The product of Example IV (1.23 g., 0.005 mole), phosphorous pentachloride (4.16 g., 0.02 mole) and antimony trichloride (10 g.) were boiled under reflux for 3 hours and the reaction product worked up as described above to give a yield of 0.60 g. of the same product. Fractional crystallization of the mother liquors after passage through a short alumina column to remove the dark impurities gave an additional 75 mg. of the product to make the total yield 0.675 g. (42%).

Example VI.—2,3,7,8-tetraphenoxy-1,4,6,9-tetraazaanthracene (A) 2,3,7,8 - tetrachloro - 1,4,6,9 - tetraazaanthracene (320 mg. 0.001 mole) and sodium phenoxide (930 mg., 0.008 mole) were boiled under reflux in 15 ml. of dimethylformamide. After cooling, the precipitate was separated by filtration and washed with hot water. After drying, the nearly colorless residue of 2,3,7,8-tetraphenoxy - 1,4,6,9 - tetraazaanthracene weighed 428 mg. (yield, 82%) M.P. 360° C. after recrystallization from dioxane.

(B) The same product was obtained when 2,3,7,8-tetrachloro-1,4,6,9-tetraazaanthracene (6.4 g., 0.02 mole) was boiled under reflux with phenol (15 g., 0.16 mole) for 14 hours. After 1 hour, nearly colorless crystals of product started to separate. After cooling, the solid mass of product was extracted with hot methanol until the methanol was colorless. The yield was 9.7 g. (88%).

CONDENSED HETEROCYCLES

Example VII.—2,2′-bisfluoflavine (A) 2,2′,3,3′-tetraphenoxy - 6,6′ - biquinoxaline (63 mg., $1 \times 10^{-4}$ mole) and o-phenylenediamine (43 mg., $4 \times 10^{-4}$ mole) were boiled under reflux in 4 g. of phenol for 1 hour. Light red crystals started to separate after about 10 minutes. After cooling, 10 ml. of dioxane was added and the precipitate was separated by filtration, washed with dioxane and dried. The yield was 39 mg. (84%) of organe crystals of 2,2′-bisfluoflavine.

Calcd. for $C_{28}H_{18}N_8$ (percent): C, 72.1; H, 3.79; N, 24.0. Found (percent): C, 72.04; H, 3.89; N, 23.88.

(B) The same product was obtained when 3,3′-diaminobenzidine (107 mg., $0.5 \times 10^{-3}$ mole) and 2,3-diphenoxyquinoxaline (628 mg., $2 \times 10^{-3}$ mole) were boiled under reflux for 1 hour and in 4 g. of phenol. After 5 minutes, light red crystals started to precipitate. After cooling, 10 ml. of dioxane was added and the orange crystals filtered, washed with dioxane and dried. The yield was 205 mg. (88%).

(C) The same product was obtained when 2,2′,3,3′-tetrahydroxy - 6,6′ - bisquinoxaline (3.22 g., 0.01 mole) and o-phenylenediamine (2.16 g. 0.02 mole) were heated in 50 g. of polyphosphoric acid for two hours at 250° C. The resultant red solution was poured into 1 liter of water with stirring. After washing with hot water and drying, the hygroscopic precipitate weighed 717 mg. The product was isolated by extraction in a Soxhlet apparatus with 88% formic acid.

Example VIII.—5,6,8,9,14,15,17,18-octaza-6,8,15,17-tetrahydroheptacene (A) 2,3,7,8-tetraphenoxy - 1,4,6,9 - tetraazaanthracene (50.2 mg., $1 \times 10^{-4}$ mole) and o-phenylenediamine (50 mg., $4.6 \times 10^{-4}$ mole) were boiled under reflux in 10 g. of phenol for 4 hours. The hot solution was filtered through a glass filter and the residue washed with dioxane and dried. The yield was 32 mg. (82%), M.P. above 360° C.

Calcd for $C_{22}H_{14}N_8$ (percent): C, 67.65; N, 28.76; H, 3.59. Found (percent): C, 67.42; N, 28.46; H, 3.50.

(B) The same product was obtained when 1,2,4,5-tetraaminobenzene tetrahydrochloride (28 mg., $1 \times 10^{-4}$ mole) and 2,3-diphenoxyquinoxaline (100 mg., $3 \times 10^{-4}$ mole) were boiled under reflux in 4 g. of phenol for 2 hours. The solid residue was separated by filtration, washed with dioxane and dried.

(C) The same product was also obtained in larger quantities when 2,3,7,8-tetrahydroxy - 1,4,6,9 - tetraazaanthracene (1.23 g., 0.005 mole) and o-phenylenediamine (1.08 g., 0.01 mole) were heated in 40 g. of polyphosphoric acid brought within 45 minutes to 300° C. and kept at that temperature for an additional 90 minutes. After cooling to 100° C., the deep violet solution was poured into ice water with stirring. The resultant red precipitate was separated by centrifugation, washed 5 times with 400 ml. of water and dried in vacuo at 120° C. to yield 2.79 g. of a green, metal-like material. The octaazatetrahydroheptacene product was soluble in dimethyl sulfoxide, formic acid and sulfuric acid and only sparingly soluble in dimethylacetamide, glacial acetic acid and nitrobenzene.

SINGLE-STRAND QUINOXALINE POLYMERS

Example IX.—Polyfluoflavine (A) 3,3'-diaminobenzidine (0.5357 g., 0.0025 mole) and 2,2',3,3'-tetraphenoxy - 6,6' - bisquinoxaline (1.5667 g. 0.0025 mole) were boiled under reflux in 60 g. of phenol for 20 hours under an atmosphere of nitrogen. The solution turned red and became turbid in about 20 minutes. After cooling to 100° C., 60 ml. of dioxane was added to the suspension and the red solid separated by centrifugation, washed with dioxane and methanol and dried. The yield was 1.15 g. of polymeric product M.P. above 360° C., having an intrinsic viscosity of 0.3 at a 0.5% concentration in sulfuric acid.

(B) Polyfluoflavine was also obtained when 3,3'-diaminobenzidine (2.143 g., 0.01 mole) and 2,2',3,3'-tetrahydroxy-6,6'-bisquinoxaline (3.223 g., 0.01 mole) were heated in 100 g. of polyphosphoric acid brought to 300° C. in 30 minutes and kept for 3 hours additional at this temperature. After cooling to 100° C., the red solution was poured into 1 liter of water with vigorous stirring. The precipitate was separated by centrifugation, washed with 3 liters of hot water and dried in vacuo at 120° C. The 6.1 g. of product was purified by redissolving it in 250 ml. of sulfuric acid filtering and pouring the solution slowly and with vigorous stirring into 2 liters of water. The precipitate was washed 5 times with 1 liter of hot water until the filtrate was free of sulfate ions. The polymeric product did not melt below 360° C. and exhibited an inherent viscosity of 0.2 at a 0.5% concentration in sulfuric acid.

Example X.—poly-(octaazatetrahydroheptacene)

(A) 3,3'-diaminobenzidine (0.4285 g., 0.002 mole) and 2,3,7,8 - tetraphenoxy - 2,4,6,9 - tetraazaanthracene (1.1014 g., 0.002 mole) were heated under reflux for 16 hours in 40 g. of phenol under an atmosphere of nitrogen. After cooling to 100° C., 40 ml. of dioxane was added and the precipitate separated by centrifugation, washed with dioxane and methanol, and dried. The 0.55 g. of polymeric product obtained melted above 360° C. It had an inherent viscosity of 0.14 at a 0.5% concentration in sulfuric acid and formed a violet color on going into solution.

(B) Poly-(octaazatetrahydroheptacene) was obtained when 2,3,7,8-tetrahydroxy-1,4,6,9-tetraazaanthracene (1.23 g., 0.005 mole) and 3,3'-diaminobenzidene (1.07 g., 0.005 mole) were heated in 50 g. of polyphosphoric acid brought to 300° C. in 30 minutes and kept at this temperature for an additional 3 hours. After cooling to 100° C., the blue solution was poured into 2 liters of water with vigorous stirring. The precipitate was washed with 4 liters of hot water and dried to yield 2.10 g. of product having a copper-like shiny color. The polymeric product had an inherent viscosity of 0.3 at 30° C. at a 0.5% concentration in sulfuric acid and formed a blue color on dissolving.

DOUBLE-STRAND QUINOXALINE POLYMERS

Example XI.—Homopolymer (A) One hundred grams of polyphosphoric acid was placed in a three-necked flask equipped with nitrogen inlet, ground glass fitted stirrer and nitrogen outlet. The flask was placed in a wax bath at 250° C. and treated with dried nitrogen for one hour and the temperature lowered to 150° C. Four grams of 2,3-dihydroxy-6,7-diaminoquinoxaline hydrochloride was added very slowly over a period of thirty minutes to one hour to the polyphosphoric acid at 150° C. When all of the quinoxaline reactant had been added and had dissolved, the reaction temperature was raised at a rate of 3–4° C. per minute up to 230° C. and kept at this temperature for five hours. The viscous reaction mixture, while still warm, was poured into 3 l. of hot water being stirred in a blender at high speed. The resultant blue-black solid was separated and dried to yield 88% of product. One gram of the crude polymer product was purified by boiling in 500 ml. of a 20% aqueous sodium hydroxide solution for five days, separated by filtraiton, extracted with water and with methanol, and dried. The purified product melted above 360° C. and had an inherent viscosity of 1.2 at a 0.5% concentration in methanesulfonic acid. This viscosity was not affected by varying the monomer concentration from 4–16% under these conditions.

(B) Ninety grams of analytical grade phosphorus pentoxide was placed in a three-necked Pyrex resin kettle. Ten ml. of ion-free water was added with cooling. The reaction vessel was then brought to room temperature, kept under nitrogen at that temperature for one hour, and then heated to 250° C. for one hour. The reaction system was cooled to 150° C. while still under nitrogen, and 5 g. of 2,3-dihydroxy-6,7-diaminoquinoxaline was added. When all the monomer had dissolved, the temperature was raised at the rate of 2 to 3° per minute to 230° C. and kept at this temperature for 5 hrs. The reaction temperature was then cooled down and ammonium carbonate and a little ion-free water were added. The black solid obtained as a result of the polymerization was suspended in 1000 ml. of distilled water, extracted with ammonium carbonate overnight, filtered, dried and extracted with water from four to five days and dried again. About a 90% yield of polymeric product was obtained having an inherent viscosity of 2.5 at a 0.5% concentration in methanesulfonic acid. The polymer had the following analysis:

Calcd for $C_8H_4N_4$ (percent): C, 61.52; H, 2.56; N, 35.92. Found (percent): C, 59.66; H, 2.60; N, 34.51.

The ultraviolet spectrum taken in sulphuric acid solution showed maxima at 272, 306, 335 (sh) 550, 592, 631, 652 (sh) millimicrons.

(C) Five grams of 2,3-diphenoxy-6,7-diaminoquinoxaline was placed in a flask attached through a Dry Ice condenser to a high vacuum system. The flask was repeatedly put under vacuum and flushed with dry nitrogen and then heated to 200° C. under nitrogen. The compound melted and began to split off phenol forming a green shiny solid. After one hour, the flask was heated to 250° C., put under vacuum to pull off the phenol and kept at this temperature for an additional hour. The reaction product was cooled, ground and put in a Morton flask, attached to a rotary evaporator and heated under vacuum at 400° C. for 4 hours. The resulting black solid was partly soluble in sulfuric acid and methanesulfonic acid. The inherent viscosity of the soluble portion (0.3% in methanesulfonic acid) was 1.0.

Example XII.—Tetraaminobenzene condensation polymers (A) Three thousandth mole of tetraaminobenzene tetrahydrochloride (0.846 g.) was slowly added to 100 g. of 80% polyphosphoric acid treated as described in Example XI-A above. When all the amine was added and had dissolved, 0.003 mole (1.75 g.) of 2,3,7,8-tetraphenoxy-1,4,6,9-tetraazaanthracene was quickly added to the solution. The reaction mixture was heated slowly to 230° C. and kept at that temperature for five hours. The polymer product was precipitated by adding the reaction mixture to 3 liters of hot water in a high speed blender. The product, in 81% yield after separation and drying, had an inherent viscosity of 0.55 at a 0.5% concentration in methanesulfonic acid.

(B) One hundredth mole of tetraaminobenzene tetrahydrochloride (2.82 g.) was condensed with 0.01 mole of 2,3,7,8-tetrahydroxy-1,4,6,9-tetraazaanthracene (2.46 g.) following the procedure described in A above. The resultant polymer product had an inherent viscosity of 0.45 at a 0.5% concentration in methanesulfonic acid.

(C) One thousandth mole of 2,3,7,8-tetrachloro-1,4,6,9-tetraazaanthracene (0.322 g.) and 0.001 mole of tetraaminobenzene hydrochloride (0.282 g.) were condensed in 50 g. of polyphosphoric acid using the procedure described above. The resulting polymer product had an inherent viscosity of 0.46 at a 0.5% concentration in methanesulfonic acid.

I claim:
1. Single-strand quinoxaline polymers having the recurring structural unit:

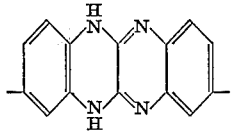

2. Single-strand quinoxaline polymers having the recurring structural unit:

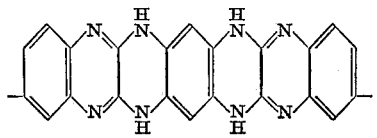

3. Double-strand quinoxaline polymers having the recurring structural unit:

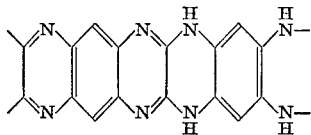

References Cited
UNITED STATES PATENTS

| | | | |
|---|---|---|---|
| 3,326,915 | 6/1967 | Jackson et al. | 260—2 |
| 3,484,387 | 12/1969 | Jackson et al. | 260—2 |

OTHER REFERENCES

Riedel et al.: Chemical Abstracts, vol. 62, col. 1774–5 (1965).

Badger et al.: Chem. Abstracts, vol. 59 (1963), col. 6396–7.

Noguchi: Chem. Abstracts, vol. 55 (1961), col. 4516–7.

SAMUEL H. BLECH, Primary Examiner

U.S. Cl. X.R.

260—30.6, 30.8, 47, 250, 268